US012411443B2

(12) United States Patent
Shimura et al.

(10) Patent No.: US 12,411,443 B2
(45) Date of Patent: Sep. 9, 2025

(54) IMAGE HEATING DEVICE AND HEATER FOR USE IN IMAGE HEATING DEVICE

(71) Applicant: CANON KABUSHIKI KAISHA, Tokyo (JP)

(72) Inventors: Yasuhiro Shimura, Yokohama (JP); Akira Kato, Mishima (JP); Atsushi Iwasaki, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/600,067

(22) Filed: Mar. 8, 2024

(65) Prior Publication Data

US 2024/0210865 A1 Jun. 27, 2024

Related U.S. Application Data

(63) Continuation of application No. 18/299,888, filed on Apr. 13, 2023, now Pat. No. 11,953,851, which is a continuation of application No. 17/710,274, filed on Mar. 31, 2022, now Pat. No. 11,644,774, which is a continuation of application No. 17/204,800, filed on Mar. 17, 2021, now Pat. No. 11,314,188, which is a (Continued)

(30) Foreign Application Priority Data

Sep. 11, 2015 (JP) ................................ 2015-179567

(51) Int. Cl.
*G03G 15/20* (2006.01)
*H05B 3/00* (2006.01)

(52) U.S. Cl.
CPC ..... *G03G 15/2053* (2013.01); *G03G 15/2039* (2013.01); *G03G 15/2042* (2013.01); *H05B 3/0095* (2013.01); *G03G 2215/2035* (2013.01)

(58) Field of Classification Search
CPC ........... G03G 15/2042; G03G 15/2039; G03G 15/2053; H05B 3/0095
See application file for complete search history.

(56) References Cited

U.S. PATENT DOCUMENTS 5,376,773 A * 12/1994 Masuda ............. G03G 15/2003 219/216
2002/0146255 A1 10/2002 Kishimoto (Continued)

FOREIGN PATENT DOCUMENTS

CN 1969592 A 5/2007
CN 101046664 A 10/2007

(Continued)

*Primary Examiner* — Christopher E Mahoney
(74) *Attorney, Agent, or Firm* — Canon U.S.A., Inc. I.P. Division

(57) ABSTRACT

In an image heating device having a plurality of heating blocks which are controllable independently in a longitudinal direction of a heater, an increase of the size of the heater can be suppressed, and temperatures of a plurality of heating block can be detected. The heater has a first temperature sensor corresponding to a first heating block, a second temperature sensor corresponding to a second heating block, a first electric conductor electrically coupled to the first temperature sensor, a second electric conductor electrically coupled to the second temperature sensor, and a common electric conductor electrically coupled to the first and second temperature sensors.

6 Claims, 14 Drawing Sheets

Related U.S. Application Data continuation of application No. 16/805,490, filed on Feb. 28, 2020, now Pat. No. 10,983,463, which is a continuation of application No. 16/540,600, filed on Aug. 14, 2019, now Pat. No. 10,671,001, which is a continuation of application No. 15/758,204, filed as application No. PCT/JP2016/003724 on Aug. 12, 2016, now Pat. No. 10,429,781.

(56) References Cited

U.S. PATENT DOCUMENTS

| | | | | |
|---|---|---|---|---|
| 2007/0237536 | A1 | 10/2007 | Roof | |
| 2012/0121306 | A1 | 5/2012 | Shimura | |
| 2013/0195477 | A1* | 8/2013 | Seshita | G03G 15/205 399/33 |
| 2013/0195494 | A1* | 8/2013 | Asami | G03G 15/2042 399/70 |
| 2013/0299480 | A1 | 11/2013 | Kakubari | |
| 2013/0343790 | A1 | 12/2013 | Shimura | |
| 2014/0076878 | A1 | 3/2014 | Shimura | |
| 2014/0169846 | A1* | 6/2014 | Shimura | H05B 3/0095 399/329 |
| 2014/0270824 | A1 | 9/2014 | Satoh | |
| 2015/0253705 | A1 | 9/2015 | Shimura | |
| 2017/0075268 | A1* | 3/2017 | Ogura | G03G 15/2053 |
| 2017/0336743 | A1* | 11/2017 | Hopkins | G03G 15/2042 |
| 2017/0363999 | A1* | 12/2017 | Miyauchi | G03G 15/2039 |
| 2018/0032008 | A1 | 2/2018 | Sako | |
| 2018/0074444 | A1* | 3/2018 | Wakatsu | G03G 15/2039 |
| 2018/0203389 | A1* | 7/2018 | Adachi | G03G 21/14 |

FOREIGN PATENT DOCUMENTS

| | | | |
|---|---|---|---|
| CN | 101078906 | A | 11/2007 |
| CN | 101303558 | A | 11/2008 |
| CN | 101673078 | A | 3/2010 |
| CN | 102217414 | A | 10/2011 |
| CN | 102566377 | A | 7/2012 |
| CN | 103327659 | A | 9/2013 |
| CN | 103676575 | A | 3/2014 |
| CN | 103946423 | A | 7/2014 |
| CN | 104380838 | A | 2/2015 |
| EP | 2711778 | A2 | 3/2014 |
| JP | H05266963 | A | 10/1993 |
| JP | H0895402 | A | 4/1996 |
| JP | H08297431 | A | 11/1996 |
| JP | H09281845 | A | 10/1997 |
| JP | H10177319 | A | 6/1998 |
| JP | H10333475 | A | 12/1998 |
| JP | 2000150113 | A | 5/2000 |
| JP | 2000315566 | A | 11/2000 |
| JP | 2001255775 | A | 9/2001 |
| JP | 2002296965 | A | 10/2002 |
| JP | 2006012444 | A | 1/2006 |
| JP | 2007256887 | A | 10/2007 |
| JP | 2008107761 | A | 5/2008 |
| JP | 2008129501 | A | 6/2008 |
| JP | 2008299205 | A | 12/2008 |
| JP | 2011128567 | A | 6/2011 |
| JP | 2014059508 | A | 4/2014 |
| JP | 2014224927 | A | 12/2014 |
| JP | 2015129789 | A * | 7/2015 |
| JP | 2017009848 | A | 1/2017 |
| KR | 20140037781 | A | 3/2014 |
| WO | 2014034744 | A1 | 3/2014 |

* cited by examiner

[Fig. 1]
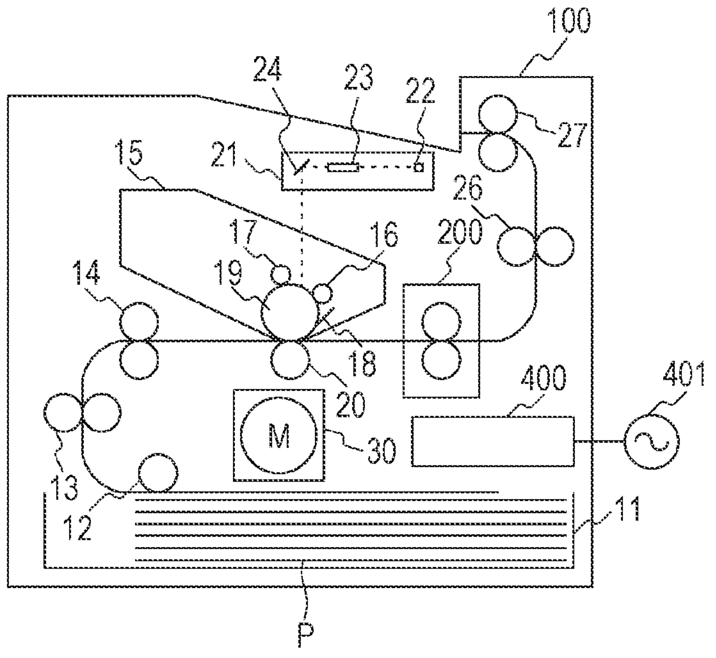

[Fig. 2]
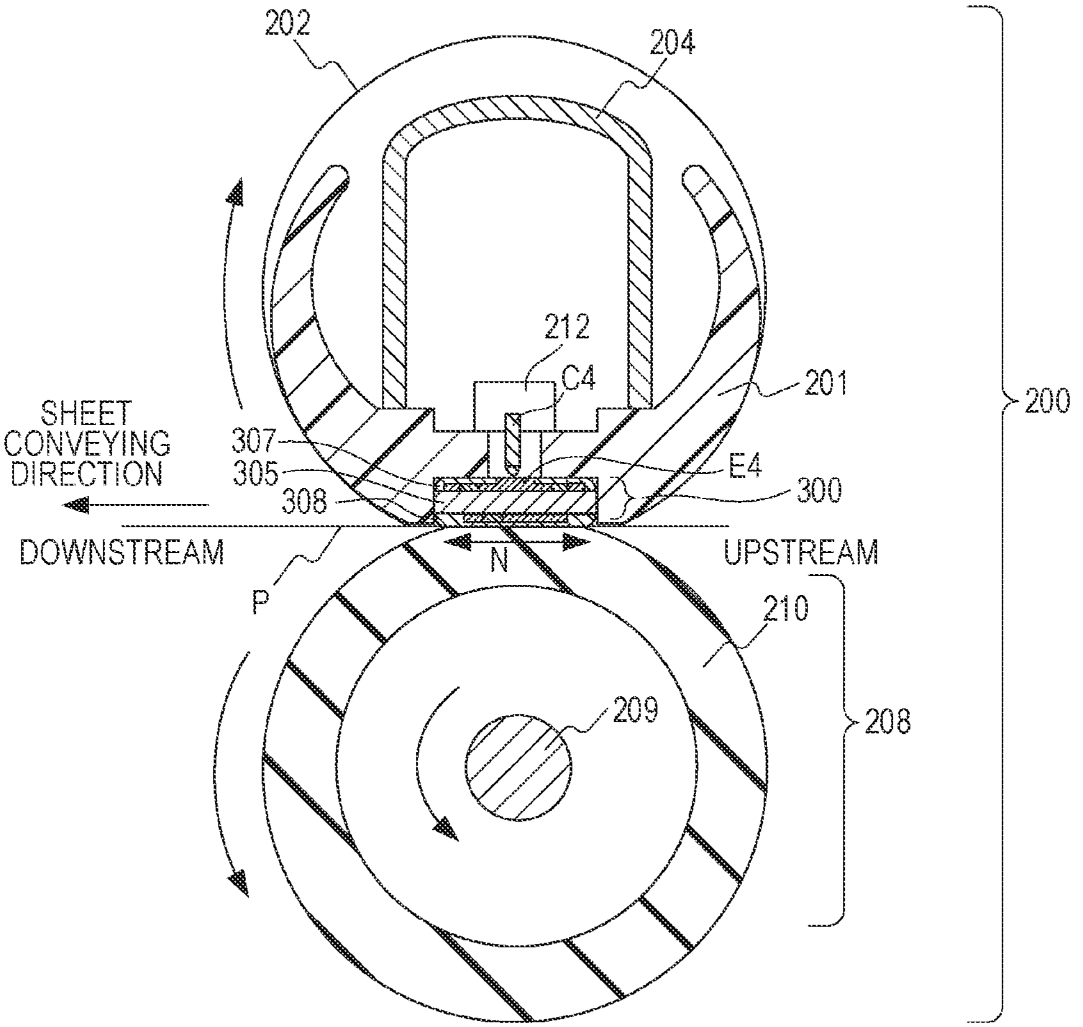
[Fig. 3A]
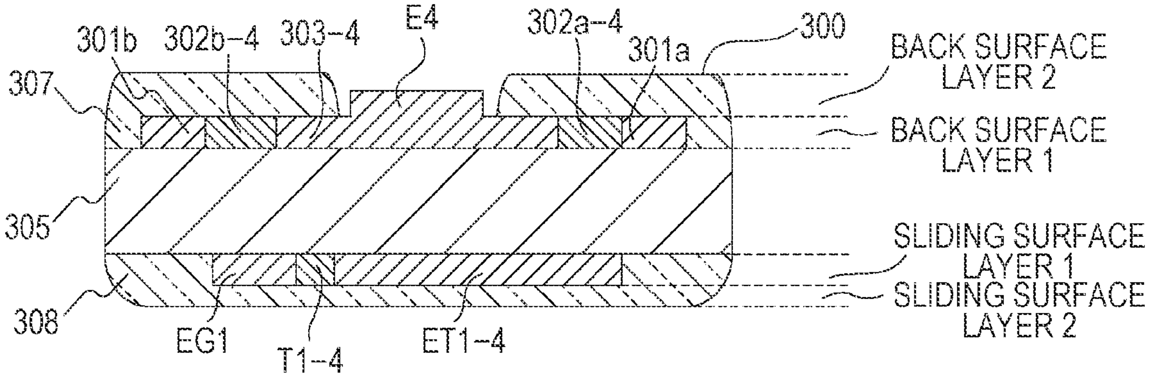

[Fig. 3B]
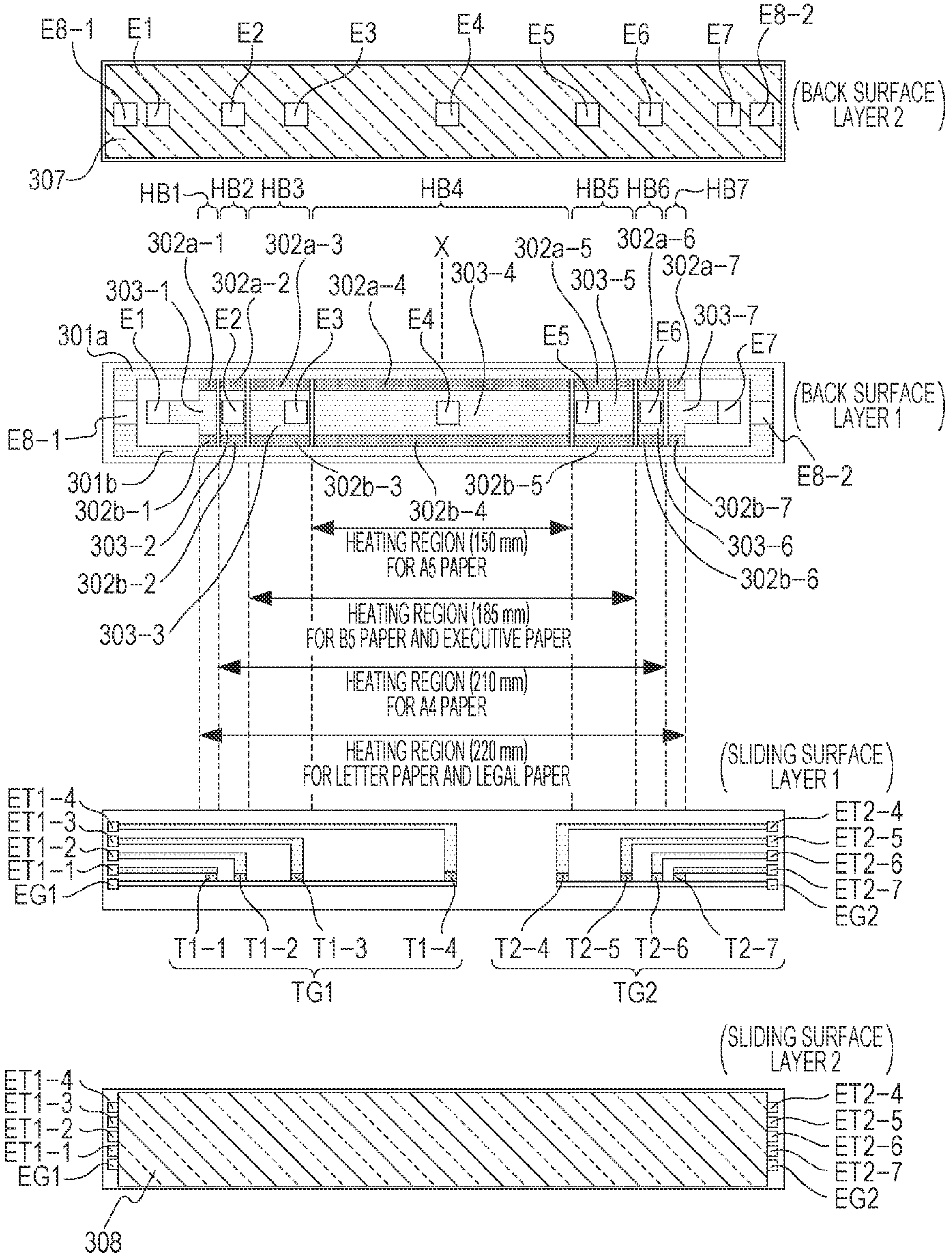

[Fig. 3C]
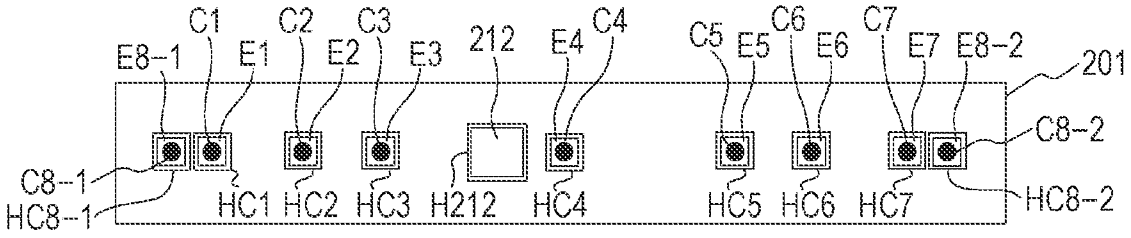

[Fig. 4]
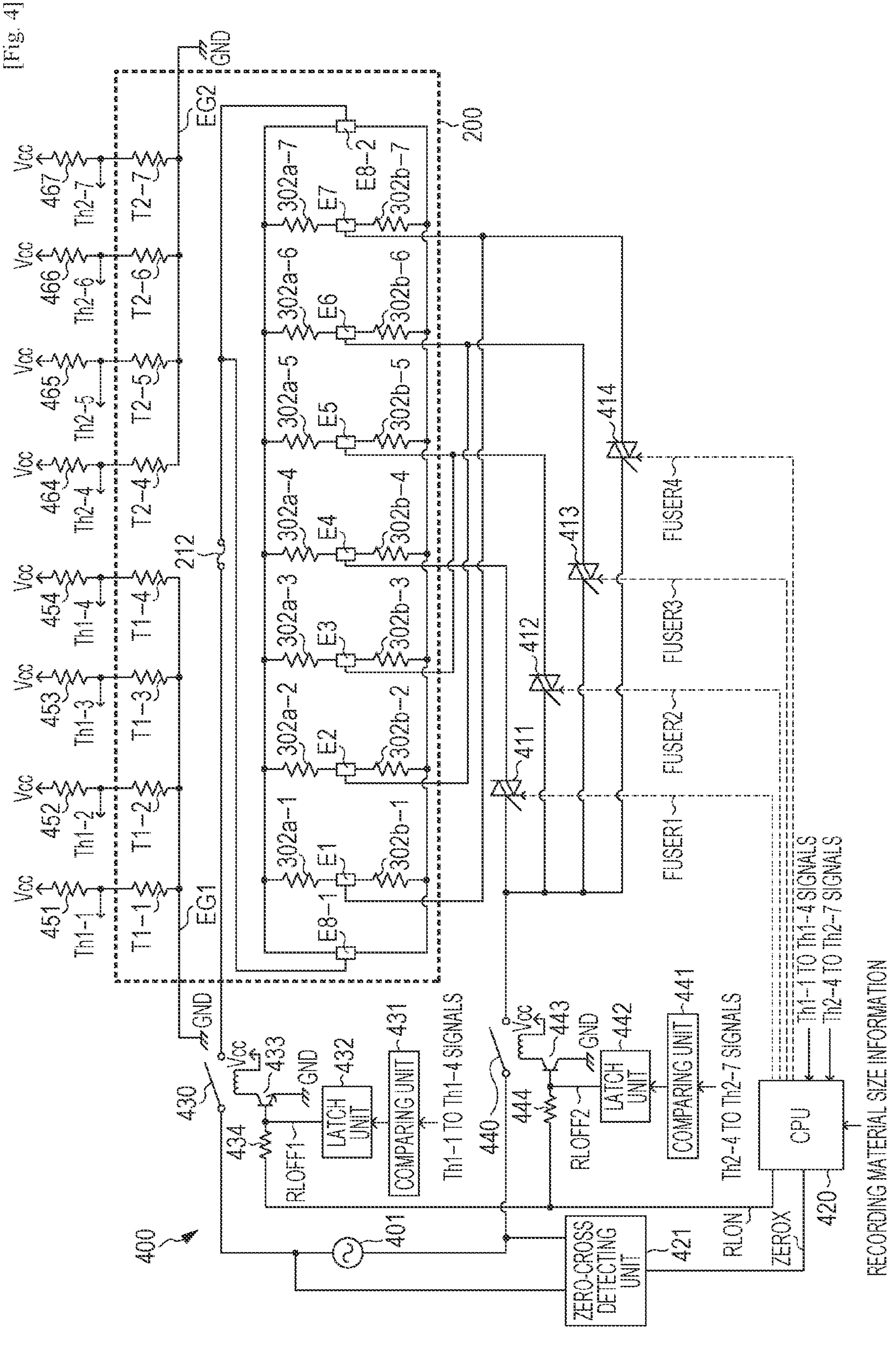

[Fig. 5]
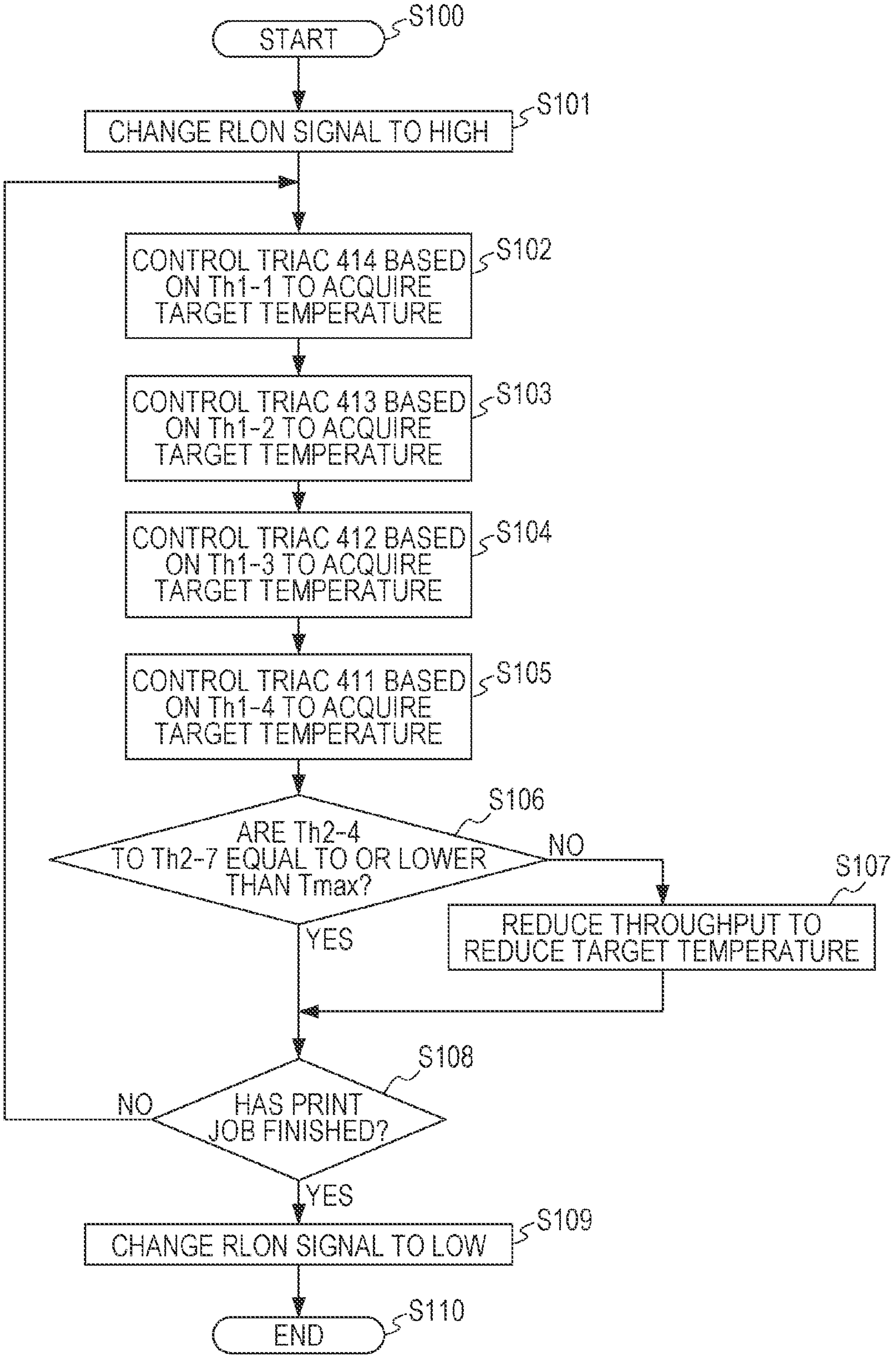

[Fig. 6A]
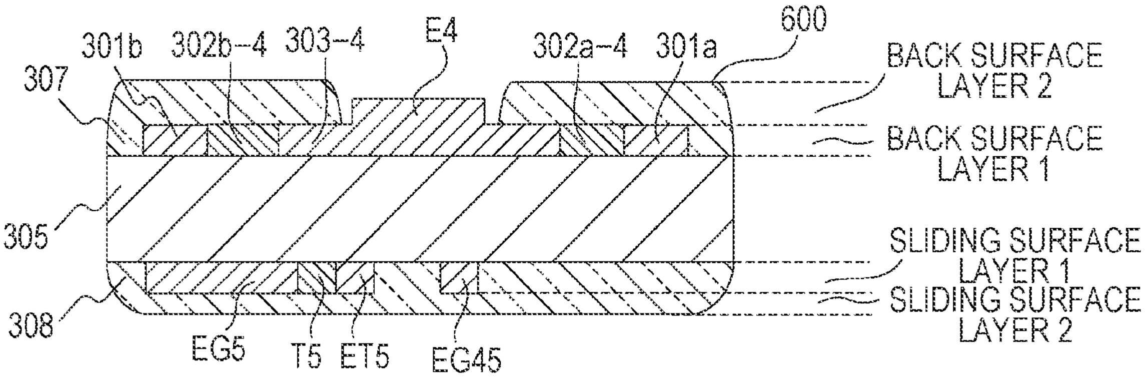

[Fig. 6B]
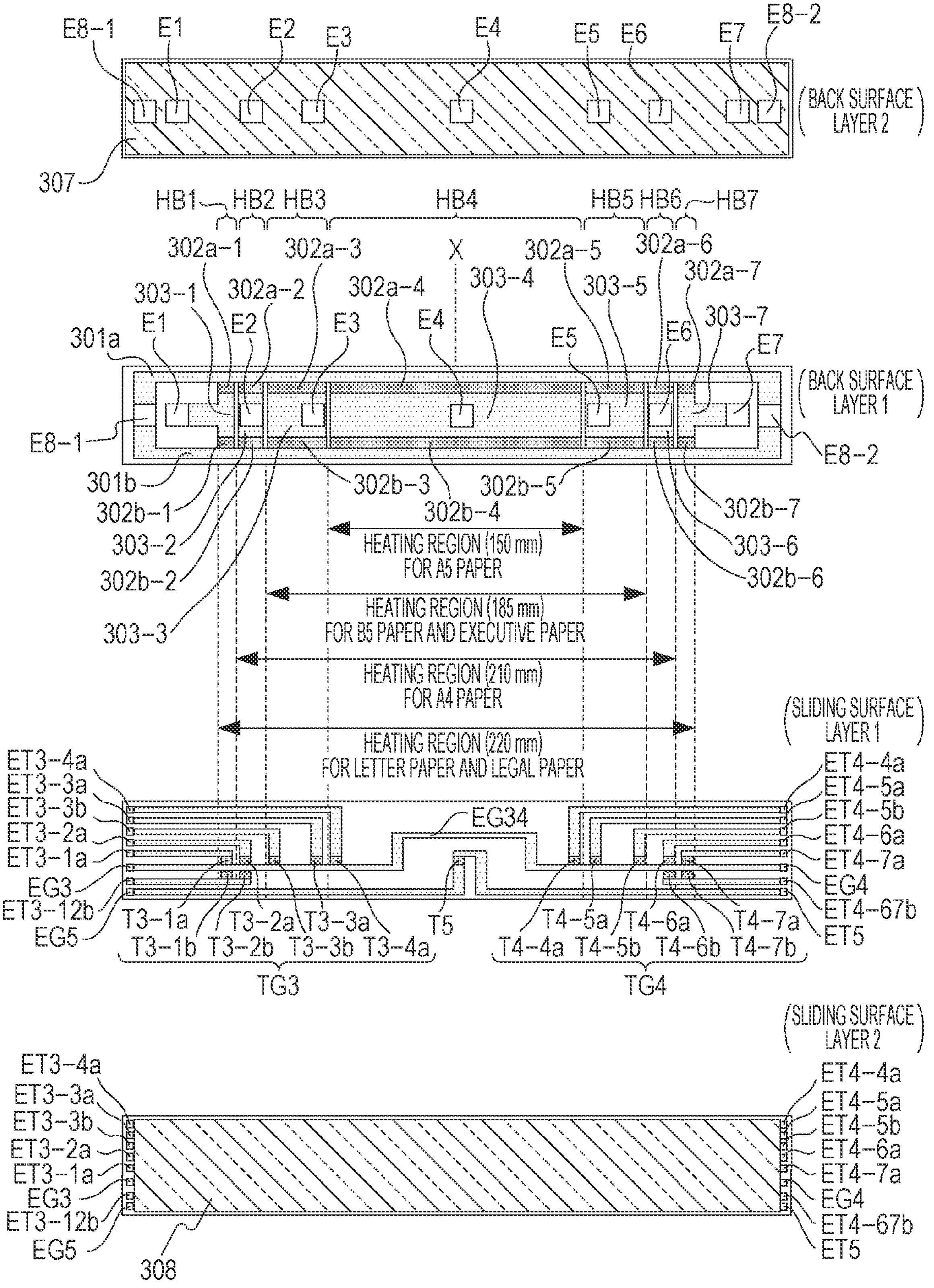

[Fig. 7]
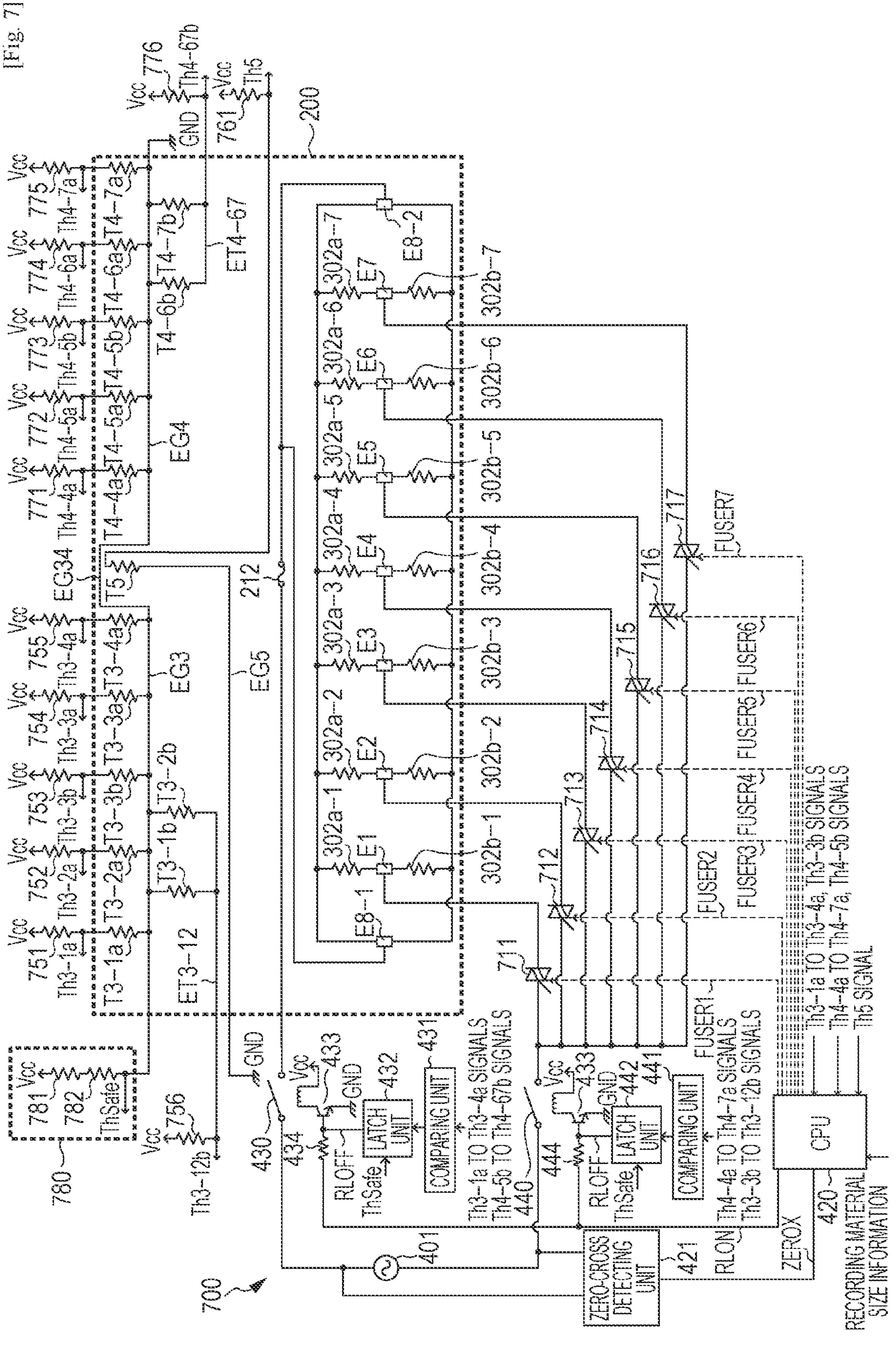

[Fig. 8]
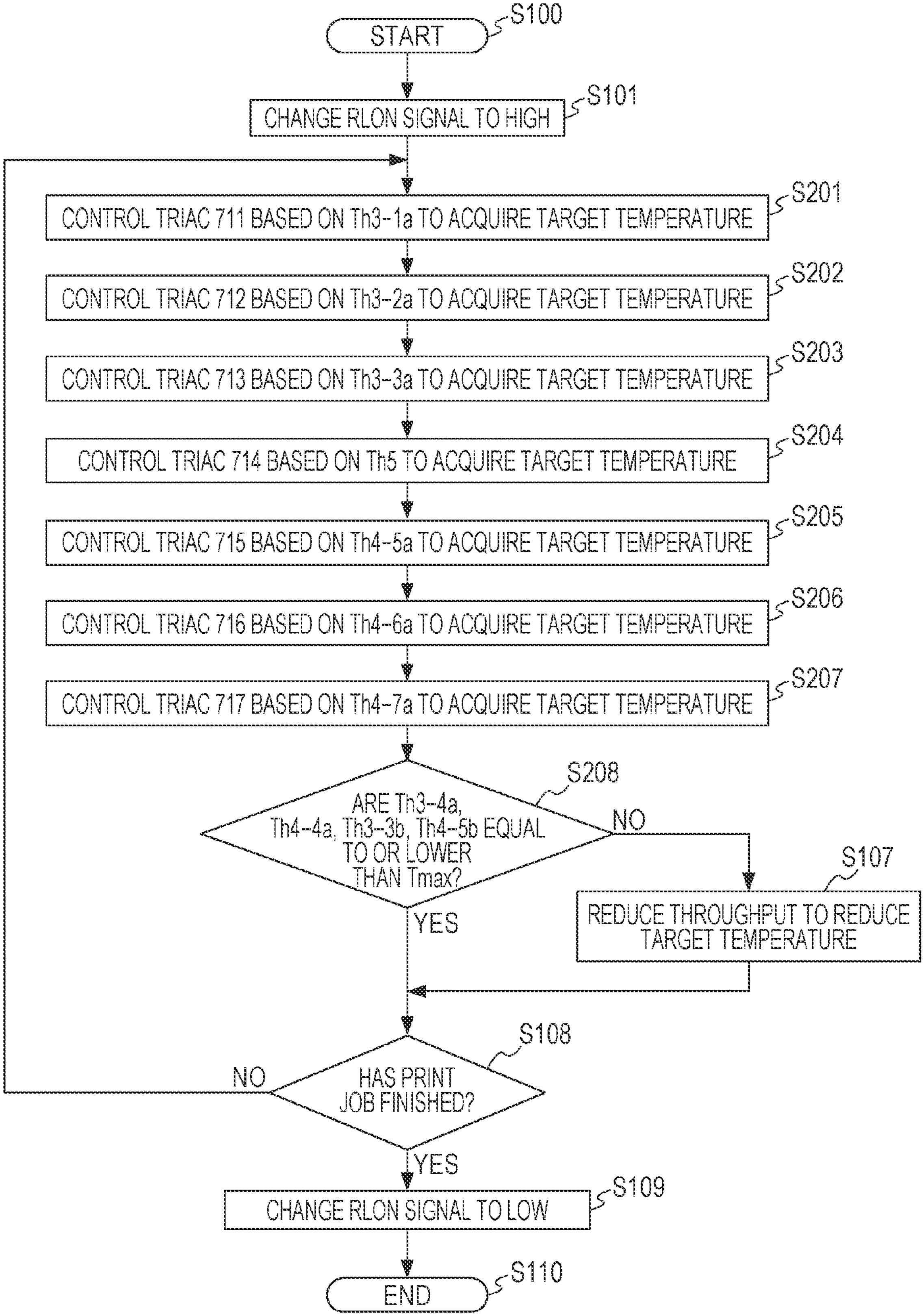

[Fig. 9A]
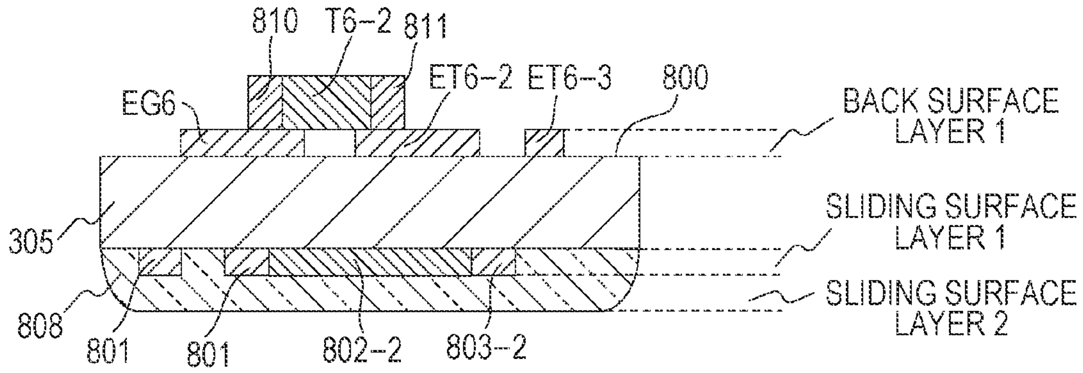
[Fig. 9B]
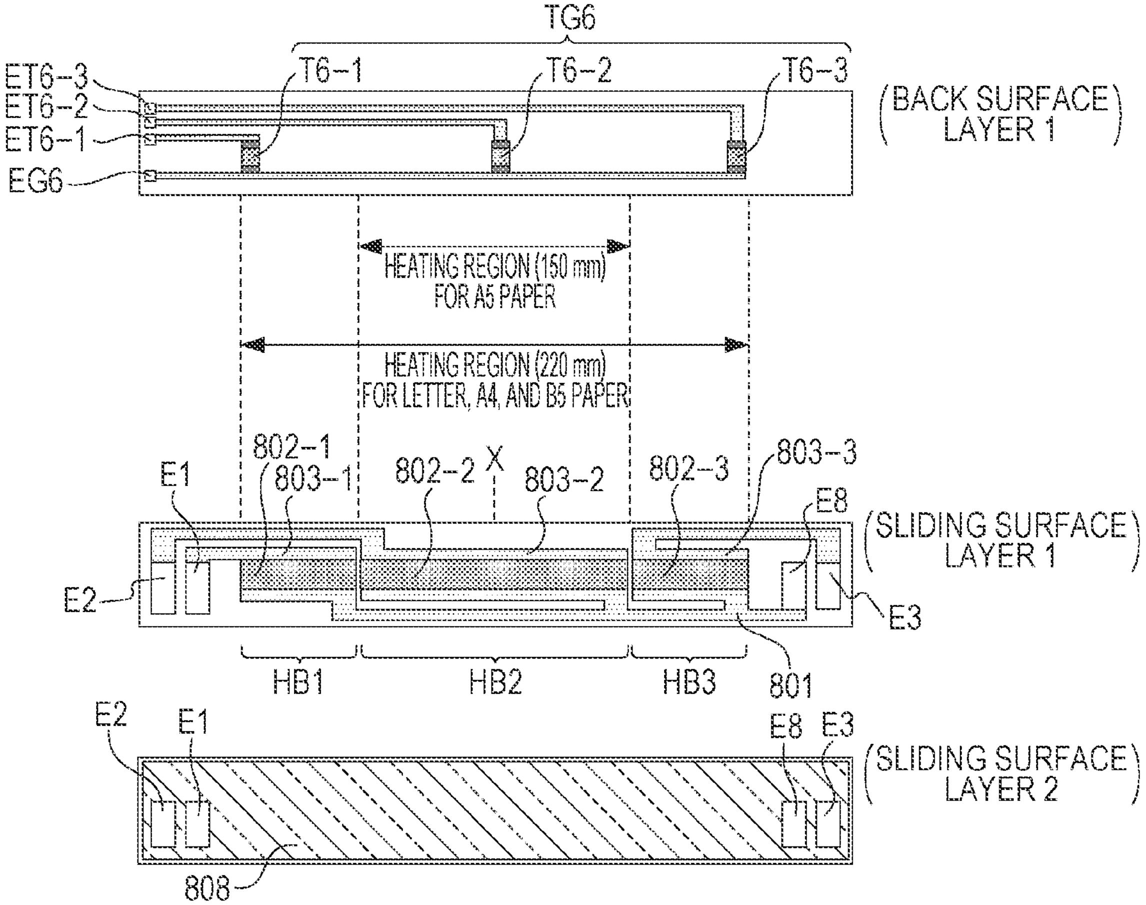

[Fig. 10A]
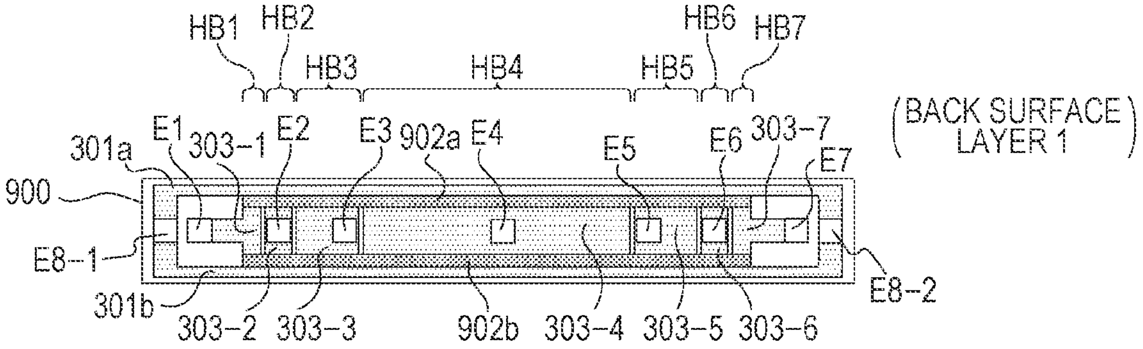
[Fig. 10B]
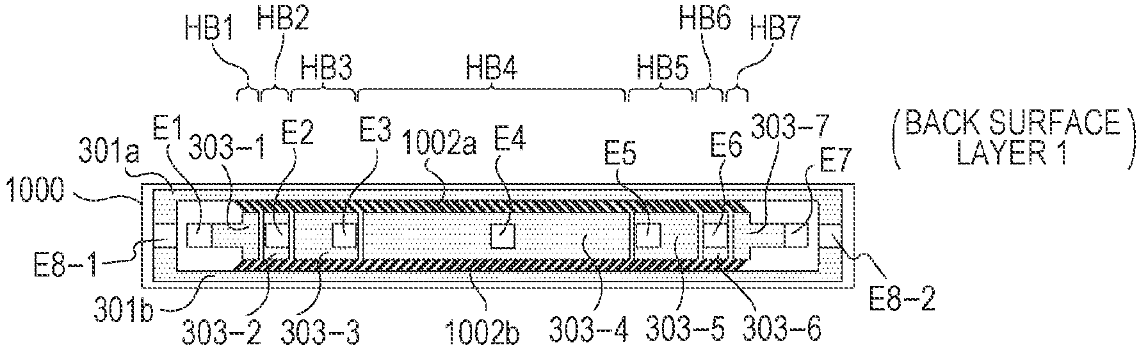

[Fig. 11A]
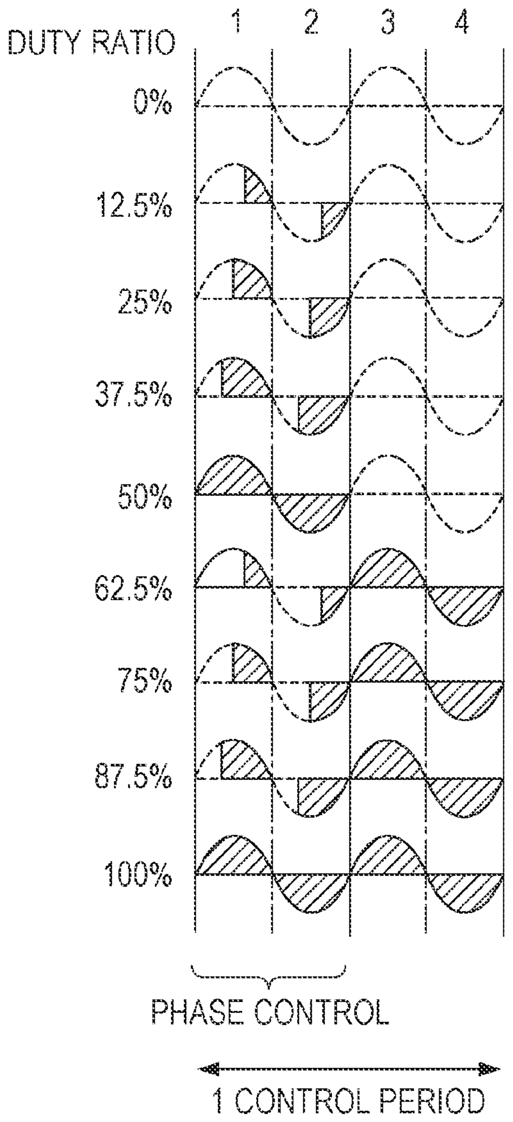

[Fig. 11B]
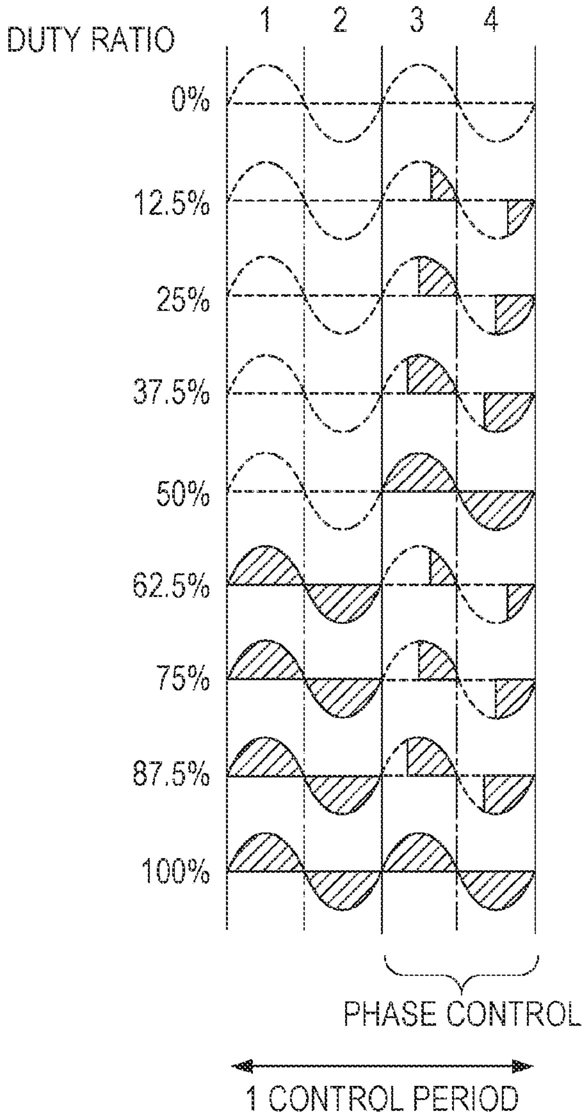

IMAGE HEATING DEVICE AND HEATER FOR USE IN IMAGE HEATING DEVICE

CROSS-REFERENCE TO RELATED APPLICATIONS

This application is a continuation of U.S. patent application Ser. No. 18/299,888, filed Apr. 13, 2023, which is a continuation of U.S. patent application Ser. No. 17/710,274, filed on Mar. 31, 2022 and issued as U.S. Pat. No. 11,644,774 on May 9, 2023, which is a continuation of U.S. patent application Ser. No. 17/204,800, filed on Mar. 17, 2021 and issued as U.S. Pat. No. 11,314,188, which is a continuation of U.S. patent application Ser. No. 16/805,490, filed Feb. 28, 2020 and issued as U.S. Pat. No. 10,983,463, issued Apr. 20, 2021, which is a continuation of U.S. patent application Ser. No. 16/540,600, filed Aug. 14, 2019 and issued as U.S. Pat. No. 10,671,001, issued Jun. 2, 2020, which is a continuation of U.S. patent application Ser. No. 15/758,204, filed Mar. 7, 2018 and issued as U.S. Pat. No. 10,429,781, issued Oct. 1, 2019, which is a National Stage application of International Patent Application No. PCT/JP2016/003724, filed Aug. 12, 2016, which claims the benefit of Japanese Patent Application No. 2015-179567, filed Sep. 11, 2015, all of which are hereby incorporated by reference herein in their entireties.

TECHNICAL FIELD

The present invention relates to an image heating device such as a fixer mounted in an image forming apparatus for electrophotographic recording such as a copier and a printer or a gloss providing device which re-heats a toner image fixed to a recording material to improve the gloss level of the toner image. The present invention further relates to a heater for use in the image heating device.

BACKGROUND ART

An image heating device includes a tubular film, a heater in contact with an inner surface of the film, and a roller forming a nip part together with the heater through the film. When an image forming apparatus having the image heating device is used to continuously print on small-sized sheets, a phenomenon may occur that the temperature of a region through which paper does not pass in a longitudinal direction in the nip part gradually increases (rise of temperature in a non-paper-passing part). An excessively increased temperature of the non-paper-passing part may damage parts within the device. In a case where printing is performed on larger-sized paper when rise of temperature in the non-paper-passing part occurs, hot offset of toner may be caused on a film in a region corresponding to a non-paper-passing part for small-sized paper.

One of schemes for suppressing such a rise of temperature in a non-paper-passing part, an apparatus has been proposed which includes a plurality of groups (heating blocks) of longitudinal heating resisters in a heater, wherein the heating distribution of the heater is changed in accordance with the size of a recording material (PLT1).

CITATION LIST

Patent Literature

PTL 1

Japanese Patent Laid-Open No. 2014-59508

SUMMARY OF INVENTION

In consideration of occurrence of a failure in such an apparatus, it may be configured so as to monitor a temperature of each heating block. Even when one of the plurality of heating blocks is uncontrollable and abnormal heating occurs, power supply may be stopped quickly based on a result of the temperature monitoring of each heating block.

However, as the number of heating blocks increases, the number of temperature sensors each for monitoring a temperature also increases. Providing many temperature sensors within a region of a substrate of the heater may increase the size of the heater.

Solution to Problem

An aspect of the present invention provides a heater for use in an image heating device, the heater including a substrate, a first heating block provided on the substrate and configured to generate heat from electric power supplied thereto, a second heating block provided at a position different from the position of the first heating block in a longitudinal direction of the substrate and configured to separately control the first heating block, a first temperature sensor provided at a position corresponding to the first heating block, a second temperature sensor provided at a position corresponding to the second heating block, a first conductive pattern electrically coupled to the first temperature sensor, a second conductive pattern electrically coupled to the second temperature sensor, and a common conductive pattern electrically coupled to the first and second temperature sensors.

Another aspect of the present invention provides a heater usable in an image heating device, the heater including a substrate, a heat generating member provided on one surface of the substrate and configured to generate heat from electric power supplied thereto, a temperature sensor provided on another surface on the opposite side of the one surface of the substrate and configured to detect a temperature of the heater, and an electrode in contact with an electric contact for supplying electric power to the heat generating member, wherein the electrode is placed within a region having the heat generating member in a longitudinal direction of the heater on the one surface of the substrate.

Further features of the present invention will become apparent from the following description of exemplary embodiments with reference to the attached drawings.

Advantageous Effects of Invention

According to the present invention, an increase of the size of a heater can be suppressed.

BRIEF DESCRIPTION OF DRAWINGS

FIG. 1 is a cross section view of an image forming apparatus.

FIG. 2 is a cross section view of an image heating device.

FIG. 3A illustrates a configuration of a heater according to a first exemplary embodiment.

FIG. 3B illustrates the configuration of the heater according to the first exemplary embodiment.

FIG. 3C illustrates the configuration of the heater according to the first exemplary embodiment.

FIG. 4 illustrates a heater control circuit according to the first exemplary embodiment.

FIG. 5 is a heater control flowchart according to the first exemplary embodiment.

FIG. 6A illustrates a configuration of a heater according to a second exemplary embodiment.

FIG. 6B illustrates a configuration of the heater according to the second exemplary embodiment.

FIG. 7 illustrates a heater control circuit according to the second exemplary embodiment.

FIG. 8 is a heater control flowchart according to the second exemplary embodiment.

FIG. 9A illustrates a variation example of the heater.

FIG. 9B illustrates the variation example of the heater.

FIG. 10A illustrates a variation example of the heater.

FIG. 10B illustrates another variation example of the heater.

FIG. 11A illustrates a conduction control pattern of a heater.

FIG. 11B illustrates another conduction control pattern of a heater.

DESCRIPTION OF EMBODIMENTS

First Embodiment

FIG. 1 is a cross section view of a laser printer (image forming apparatus) 100 applying an electrophotographic recording technology. In response to occurrence of a print signal, a scanner unit 21 emits laser light modulated based on image information so that a photosensitive member 19 electrostatically charged to a predetermined polarity by a charging roller 16 can be scanned. Thus, an electrostatic latent image is formed on the photosensitive member 19. Toner is supplied from a developing unit 17 to the electrostatic latent image so that a toner image according to the image information is formed on the photosensitive member 19. On the other hand, recording materials (recording paper) P stacked in a paper feed cassette 11 are fed one by one by a pickup roller 12 and are conveyed by a roller 13 toward a resist roller 14. Each of the recording materials P is conveyed from the resist roller 14 to a transfer position simultaneously with a time when the toner image on the photosensitive member 19 reaches the transfer position formed by the photosensitive member 19 and a transfer roller 20. During a process in which the recording material P passes through the transfer position, the toner image on the photosensitive member 19 is transferred to the recording material P. After that, the recording material P is heated by an image heating device (fixing device) 200 so that the toner image is heated and is fixed to the recording material P. The recording material P bearing the fixed toner image is output to a tray in an upper part of the laser printer 100 through rollers 26 and 27. A cleaner 18 cleans the photosensitive member 19. A motor 30 drives an image heating device 200 and so on. Electric power is supplied from a control circuit 400 connected to a commercial alternating current (AC) power supply 401 to the image heating device 200. The photosensitive member 19, charging roller 16, scanner unit 21, developing unit 17, and transfer roller 20 are components of an image forming unit configured to form an unfixed image to a recording material P. A cartridge 15 is a replaceable unit. The laser printer 100 further includes a light source 22, a polygon mirror 23, and a reflection mirror 24.

The laser printer 100 according to this exemplary embodiment supports a plurality of sizes of recording material. Letter paper (about 216 mm×279 mm) and Legal paper (about 216 mm×356 mm) can be set in the paper feed cassette 11. In addition, A4 paper (210 mm×297 mm), Executive paper (about 184 mm×267 mm), JIS B5 paper (182 mm×257 mm), and A5 paper (148 mm×210 mm) can be set therein.

The printer in this embodiment is a laser printer fundamentally configured to feed paper vertically (or paper can be conveyed such that the long side of the paper can be in parallel with the conveying direction). The present configuration is also applicable to a printer which feed paper horizontally. Letter paper and Legal paper are largest (widest) among regular recording materials (based on widths of recording materials on catalogs) supported by the apparatus and have a width of about 216 mm. In the following description of this exemplary embodiment, a recording material P having a paper width smaller than a maximum size supported by the apparatus will be called small-sized paper.

FIG. 2 is a cross section view of the image heating device 200. The image heating device 200 has a tubular film 202, a heater 300 in contact with an inner surface of the film 202, and a pressure roller (nip part forming member) 208 forming a fixing nip part N together with the heater 300 through the film 202. The film 202 has a base layer made of a heat-resistant resin such as polyimide or metal such as stainless. The film 202 may have an elastic layer of heat-resistant rubber. The pressure roller 208 has a cored bar 209 made of iron, aluminum, or the like, and an elastic layer 210 made of silicone rubber. The heater 300 is held by a holding member 201 of heat-resistant resin such as liquid crystal polymer. The holding member 201 has a guide function for guiding rotation of the film 202. The pressure roller 208 rotates in the direction as indicated by the arrow illustrated in FIG. 2 by receiving motive power from the motor 30. Rotation of the pressure roller 208 is followed by rotation of the film 202. The recording material P bearing an unfixed toner image is pinched and is conveyed by the fixing nip part N to be heated and be fixed. The apparatus 200 as described above has the tubular film 202 and the heater 300 in contact with an inner surface of the film 202, and an image formed on the recording material is heated by the heater 300 through the film 202.

The heater 300 has a ceramic substrate 305, and a heating resister (heat generating member) (see FIGS. 3A to 3C) provided on the substrate 305 for generating heat which supplies electric power. A surface protection layer 308 of glass for providing a sliding property to the film 202 is provided on a surface (first surface) close to the fixing nip part N of the substrate 305. A surface protection layer 307 of glass for insulating a heating resister is provided on the opposite surface (second surface) of the plane close to the fixing nip part N of the substrate 305. The second surface has an electrode (representatively indicated by E4) exposed, and when an electric contact (representatively indicated by C4) for feeding power touches the electrode, the heating resister is coupled electrically to the AC power supply 401. Details of the heater 300 will be described below.

A protection element 212 such as a thermo switch and a temperature fuse is configured to block electric power to be supplied to the heater 300 in response to abnormal heating of the heater 300. The protection element 212 may be abutted against the heater 300 or may be placed in a gap of the heater 300. A metallic stay 204 for applying pressure of a sprint, not illustrated, to the holding member 201 plays a role of reinforcing the holding member 201 and heater 300.

FIGS. 3A and 3B illustrate a configuration of the heater 300 according to the first exemplary embodiment. FIG. 3A illustrates a cross section view of the heater 300 near a conveyance reference position X on the recording material P illustrated in FIG. 3B. FIG. 3B is a plan view of layers of the heater 300. FIG. 3C is a plan view of the holding member configured to hold the heater 300.

The printer according to this embodiment is a center reference printer configured to convey a recording material by placing the center of the recording material in the width direction (orthogonal to the conveying direction) at the conveyance reference position X.

Next, details of the configuration of the heater 300 will be described. A back surface layer 1 of the heater 300 which is a heater surface on the opposite side of the heater surface in contact with the film 202 has thereon a plurality of heating blocks each having a group of a first electric conductor 301, a second electric conductor 303, and a heating resister (heat generating member) 302 in the longitudinal direction of the heater 300. The heater 300 of this exemplary embodiment has a total of seven heating blocks HB1 to HB7. Assuming one of the seven heating blocks as a first heating block and another heating block as a second heating block, the heater 300 has a following configuration. That is, the heater 300 has a substrate and the first heating block provided on the substrate for generating heat by receiving power supply. The heater 300 further has the second heating block which is provided at a position different from the position of the first heating block in the longitudinal direction of the substrate and is controlled independently from the first heating block. The independent control over the heating blocks will be described below.

Each of the heating blocks has a first electric conductor 301 and a second electric conductor 303. The first electric conductors 301 are provided along the longitudinal direction of the substrate, and the second electric conductors 303 are provided along the longitudinal direction of the substrate at positions different from the positions of the first electric conductors 301 in the short-side direction of the substrate. Each of the heating blocks further has a heating resister 302 provided between the first electric conductor 301 and the second electric conductor 303 for generating heat from electric power supplied through the first electric conductor 301 and the second electric conductor 303.

The heating resisters 302 in the heating blocks may be divided into heating resisters 302*a* and heating resisters 302*b* at mutually symmetrical positions about the center of the substrate in the short-side direction of the heater 300. The first electric conductors 301 may be divided into electric conductors 301*a* connected to the heating resisters 302*a* and electric conductors 301*b* connected to the heating resisters 302*b*. Because the heating resisters 302*a* and the heating resisters 302*b* are placed at mutually symmetrical positions about the center of the substrate, the substrate is not easily broken even when the heater generates heat and a heat stress occurs in the substrate.

Because the heater 300 has the seven heating blocks HB1 to HB7, the heating resisters 302*a* include seven heating resisters 302*a*-1 to 302*a*-7. In the same manner, the heating resisters 302*b* include seven of 302*b*-1 to 302*b*-7. The second electric conductors 303 include seven electric conductors 303-1 to 303-7. The heating resisters 302*a*-1 to 302*a*-7 are placed on an upstream side in the conveying direction of the recording materials P within the substrate 305, and the heating resisters 302*b*-1 to 302*b*-7 are placed on a downstream side in the conveying direction of the recording materials P within the substrate 305.

A back surface layer 2 of the heater 300 has thereon an insulative surface protection layer 307 (of glass in this exemplary embodiment) which covers the heating resisters 302, the first electric conductors 301, and the second electric conductors 303. In this case, the surface protection layer 307 does not cover electrodes E1 to E7, and E8-1 and E8-2 in contact with electric contacts C1 to C7, and C8-1 and C8-2 for feeding power. The electrodes E1 to E7 supply electric power to the heating blocks HB1 to HB7 through the second electric conductors 303-1 to 303-7, respectively. The electrodes E8-1 and E8-2 feed electric power to the heating blocks HB1 to HB7 through the first electric conductors 301*a* and 301*b*.

Because the resistance values of the electric conductors are not equal to zero, the resistance has an influence on the heating distribution in the longitudinal direction of the heater 300. Accordingly, the electrodes E8-1 and E8-2 are separated on both ends in the longitudinal direction of the heater 300 so as to prevent nonuniformity of the heating distribution even when influenced by electric resistances of the first electric conductors 301*a* and 301*b* and second electric conductor 303-1 to 303-7.

As illustrated in FIG. 2, a safety element 212 and the electric contacts C1 to C7, C8-1, and C8-2 are placed between the stay 204 and the holding member 201. As illustrated in FIG. 3C, the holding member 201 has holes HC1 to HC7, HC8-1, and HC8-2 through which the electric contact C1 to C7, C8-1, and C8-2 connected to the electrodes E1 to E7, E8-1, and E8-2 extend. The holding member 201 further has a hole H212 through which the heat-sensitive part of the protection element 212 extends. The electric contacts C1 to C7, C8-1, and C8-2 are electrically coupled to the corresponding electrodes by urging of a spring, welding or other scheme. The protection element 212 is also urged by the spring, and the heat-sensitive part is in contact with the surface protection layer 307. The electric contacts are connected to a control circuit 400 in the heater 300, which will be described below, through a cable or a conductive member such as a thin metal plate provided between the stay 204 and the holding member 201.

Providing the electrodes on the back surface of the heater 300 can eliminate the necessity for providing a region for wiring which electrically connects the second electric conductors 303-1 to 303-7 on the substrate 305, which thus can reduce the width in the short-side direction of the substrate 305. Therefore, an increase of the size of the heater can be prevented. As illustrated in FIG. 3B, the electrodes E2 to E6 are provided within a region having the heating resisters in the longitudinal direction of the substrate.

The heater 300 of this embodiment separately controls the plurality of heating blocks so that various heating distributions can be formed, which will be described below. For example, a heating distribution in accordance with the size of a recording material can be defined. Furthermore, the heating resisters 302 may be formed from a material having a PTC (Positive Temperature Coefficient). The use of a material having a PTC can suppress a temperature rise of the non-paper-passing part even in a case where an end of the recording material is not matched with a boundary of the heating blocks.

A sliding surface layer 1 closer to a sliding surface (in contact with the film) of the heater 300 has thereon a plurality of thermistors (temperature sensors) T1-1 to T1-4, and T2-4 to T2-7 configured to sense temperatures of the heating blocks HB1 to HB7. The thermistors may be made of a material having a positively or negatively large TCR (Temperature Coefficient of Resistance). According to this embodiment, the thermistors are formed by printing a material having an NTC (Negative Temperature Coefficient) thinly on the substrate. One or more thermistors provided for each of the heating blocks HB1 to HB7 can sense temperatures of all of the heating blocks.

Assuming that one of the thermistors T1-1 to T1-4 is a first temperature sensor and another one of the thermistors T1-1 to T1-4 is a second temperature sensor, the heater 300 has the following configuration. That is, the heater 300 has the first temperature sensor at a position corresponding to the first heating block and the second temperature sensor at a position corresponding to the second heating block.

The thermistors T1-1 to T1-4 are electrically coupled to the conductive patterns ET1-1 to ET1-4, respectively, on the substrate 305. Assuming that a conductive pattern to be connected to the first temperature sensor of the conductive patterns ET1-1 to ET1-4 is a first conductive pattern and a conductive pattern connected to the second temperature sensor is a second conductive pattern, the heater 300 has the following configuration. That is, the heater 300 has the first conductive pattern electrically coupled to the first temperature sensor and the second conductive pattern electrically coupled to the second temperature sensor. The heater 300 further has a common conductive pattern EG1 electrically coupled to the first and second temperature sensors. Hereinafter, a group of the thermistors T1-1 to T1-4, the conductive patterns ET1-1 to ET1-4, and the common conductive pattern EG1 will be called a thermistor group TG1.

The heater 300 further has a thermistor group TG2 of the thermistors T2-4 to T2-7, the conductive patterns ET2-4 to ET2-7, and a common conductive pattern EG2. The thermistor groups TG1 and TG2 are provided on a substrate surface on the opposite side of the substrate surface having the first and second heating blocks of the substrate 305.

According to this example, at least one corresponding thermistor is provided for each of the heating blocks HB1 to HB7. However, providing one corresponding thermistor for at least two heating blocks may also improve the reliability of the apparatus. However, as in this embodiment, at least one corresponding thermistor may be provided for all of the heating blocks.

By using the common conductive patterns EG1 and EG2 as in this embodiment to handle the first and second temperature sensors as one group, the following effect may be provided. That is, the cost for conductive patterns can be reduced and an increase of the size of the heater can be prevented, compared to a case where two conductive patterns are connected to each of the thermistors T1-1 to T1-4 without using a common conductive pattern.

In order to acquire a sliding property of the film 202, a surface (sliding surface layer 2) close to the fixing nip part N of the substrate 305 is coated by an insulative surface protection layer 308 (of glass in this embodiment). The surface protection layer 308 covers the thermistors T1-1 to T1-4 and T2-4 to T2-7, the conductive patterns ET1-1 to ET1-4 and ET2-4 to ET2-7, and the common conductive patterns EG1 and EG2. However, in order to acquire connection to the electric contacts, a part of the conductive patterns ET1-1 to ET1-4 and ET2-4 to ET2-7 and a part of the common conductive patterns EG1 and EG2 are exposed at both ends of the heater 300 as illustrated in FIG. 3B.

FIG. 4 is a circuit diagram of the control circuit 400 in the heater 300. A commercial AC power supply 401 is connected to the laser printer 100. Power control over the heater 300 is executed by conduction/non-conduction of triacs 411 to 414. The triacs 411 to 414 operate in accordance with FUSER1 to FUSER4 signals from the CPU 420. A driving circuit for the triacs 411 to 414 is not illustrated in FIG. 4.

It may be understood from FIGS. 3A to 3C and FIG. 4 that the seven heating blocks HB1 to HB7 are divided into four groups (group 1: HB4, group 2: HB3 and HB5, group 3: HB2 and HB6, and group 4: HB1 and HB7). The control circuit 400 in the heater 300 has a circuit configuration capable of controlling the four groups independently from each other. The triac 411, the triac 412, the triac 413, and the triac 414 can control the group 1, the group 2, the group 3, and the group 4, respectively.

A zero-crossing detecting unit 421 is a circuit configured to detect zero-crossing of the AC power supply 401 and outputs a ZEROX signal to the CPU 420. The ZEROX signal is usable as a reference signal for controlling phases of the triacs 411 to 414, for example.

Next, a method for detecting a temperature of the heater 300 will be described. The thermistor group TG1 will be described first. The CPU 420 receives signals (Th1-1 to Th1-4) acquired by dividing voltage Vcc by a resistance value of the thermistors (T1-1 to T1-4) and the resistance value of the resistances (451 to 454). For example, the signal Th1-1 is a signal acquired by dividing voltage Vcc by a resistance value of the thermistor T1-1 and a resistance value of the resistance 451. Because thermistor T1-1 has a resistance value according to the temperature, when the temperature of the heating block HB1 changes, the level of the signal Th1-1 to be input to the CPU also changes. The CPU 420 converts the input signal Th1-1 to a temperature according to the level. Because the same processing is performed on the signals Th1-2 to Th1-4 corresponding to the other thermistors T1-2 to T1-4 in the thermistor group TG1, any repetitive description will be omitted.

Next, the thermistor group TG2 will be described. In the thermistor group TG2, like the thermistor group TG1, the CPU 420 receives signals (Th2-4 to Th2-7) acquired by dividing voltage Vcc by resistance values of the thermistors (T2-4 to T2-7) and resistance values of resistances (464 to 467). Because the same method for converting to a temperature is applied by the CPU 420 as that for the thermistor group TG1, any repetitive description will be omitted.

Next, power control over the heater 300 (temperature control over the heater) will be described. During fixing processing, the heating blocks HB1 to HB7 are controlled such that the temperatures sensed by the thermistors (T1-1 to T1-4) in the thermistor group TG1 can be maintained at a set temperature (control target temperature). More specifically, the electric power to be supplied to the group 1 (heating block HB4) is controlled by controlling the driving of the triac 411 such that the temperature sensed by the thermistor T1-4 can be maintained at a set temperature. The electric power to be supplied to the group 2 (heating blocks HB3 and HB5) is controlled by controlling the driving of the triac 412 such that the temperature sensed by the thermistor T1-3 can be maintained at a set temperature. The electric power to be supplied to the group 3 (heating blocks HB2 and HB6) is controlled by controlling the driving of the triac 413 such that the temperature sensed by the thermistor T1-2 can be maintained at a set temperature. The electric power to be supplied to the group 4 (heating blocks HB1 and HB7) is controlled by controlling the driving of the triac 414 such that the temperature sensed by the thermistor T1-1 can be maintained at a set temperature. The thermistors in the thermistor group TG1 are used for executing control for maintaining the heating blocks at a predetermined temperature.

The CPU 420 calculates amounts of power supply by performing PI control, for example, based on the set temperatures (control target temperature) for the heating blocks and the temperatures sensed by the thermistors (T1-1 to T1-4) within the thermistor group TG1. Furthermore, the amounts of power supply are converted to control times for the corresponding phase angle (phase control) or a wave number (wave number control), and the triacs 411 to 414 are controlled based on the control times. The set temperature for the groups in the apparatus of this embodiment is 250° C. for fixing plain paper having a maximum size. The set temperature for the group 1 is 250° C. and the set temperature for the other groups is lower than 250° C. for fixing plain paper having a smaller size. The set temperatures for the groups may be defined in accordance with information such as a size, a type, and a surface property of a recording material.

A relay 430 and a relay 440 are mounted as units for shutting down electric power to the heater 300 when the temperature of the heater 300 excessively rises due to a failure in the apparatus, for example. Next, circuit operations of the relay 430 and relay 440 will be described.

When an RLON signal output from the CPU 420 is changed to a High state, the transistor 433 is changed to an ON state, and conduction is brought from the direct current power supply (voltage Vcc) to a secondary coil of the relay 430. The primary side contact of the relay 430 is changed to an ON state. When the RLON signal is changed to a Low state, the transistor 433 is changed to an OFF state. Electric current fed from the power supply (voltage Vcc) to the secondary coil of the relay 430 is blocked, and the primary side contact of the relay 430 is changed to an OFF state. Also, when the RLON signal is changed to a High state, the transistor 443 is changed to an ON state. Conduction is brought from the power supply (voltage Vcc) to the secondary coil of the relay 440, and the primary side contact of the relay 440 is changed to an ON state. When the RLON signal is changed to a Low state, the transistor 443 is changed to an OFF state. The electric current fed from the power supply (voltage Vcc) to the secondary coil of the relay 440 is blocked, and the primary side contact of the relay 440 is changed to an OFF state.

Next, operations of a protection circuit employing the relay 430 and relay 440 (or hardware circuit not through the CPU 420) will be described. When a level of one of the signals Th1-1 to Th1-4 exceeds a predetermined value set within a comparing unit 431, the comparing unit 431 causes a latch unit 432 to operate, and the latch unit 432 latches an RLOFF1 signal to a Low state. When the RLOFF1 signal is changed to a Low state, the transistor 433 is maintained at an OFF state even though the CPU 420 changes the RLON signal to a High state. Thus, the relay 430 can be kept at an OFF state (or a safe state). The latch unit 432 in a non-latching mode outputs the RLOFF1 signal for an open state.

Also, when a level of one of the signals Th2-4 to Th2-7 exceeds the predetermined value set within a comparing unit 441, the comparing unit 441 is caused to operate a latch unit 442, and the latch unit 442 latches an RLOFF2 signal to a Low state. When the RLOFF2 signal is changed to a Low state, the relay 440 can keep the OFF state (or safe state) because the transistor 443 is kept at an OFF state even though the CPU 420 changes the RLON signal to a High state. The latch unit 442 in the non-latching state outputs the RLOFF signal for an open state. Both of the predetermined value set within the comparing unit 431 and the predetermined value set within the comparing unit 441 are equivalent to 300° C.

Next, protection operations of a circuit employing the two thermistor groups TG1 and TG2 will be described. As illustrated in FIGS. 3A to 3C and FIG. 4, one thermistor of the thermistor group TG1 and one thermistor of the thermistor group TG2 are provided for each of the four groups (groups 1 to 4). At least one thermistor is provided for each of the heating blocks HB1 to HB7. More specifically, for the group 1 (HB4), the thermistor T1-4 in the thermistor group TG1 and the thermistor T2-4 in thermistor group TG2 are placed correspondingly. For the group 2 (HB3 and HB5), the thermistor T1-3 in the thermistor group TG1 and the thermistor T2-5 in the thermistor group TG2 are placed correspondingly. For the group 3 (HB2 and HB6), the thermistor T1-2 in the thermistor group TG1 and the thermistor T2-6 in the thermistor group TG2 are placed correspondingly. For the group 4 (HB1 and HB7), the thermistor T1-1 in the thermistor group TG1 and the thermistor T2-7 in the thermistor group TG2 are placed correspondingly. For each of the heating blocks HB1 to HB7, at least one thermistor of the eight thermistors is placed correspondingly. This layout of the thermistors can improve the reliability of the protection operations performed by the circuit when the apparatus fails. This will be described below.

For example, a case is assumed in which one of the thermistors T1-1 to T1-4 in the thermistor group TG1 fails. Even when a group including a heating block corresponding to the failed thermistor is uncontrollable due to the failed thermistor, the group having the heating block having the failed thermistor also includes the thermistor (one of T2-4 to T2-7) in the thermistor group TG2. Thus, the protection circuit works through the thermistor in the thermistor group TG2 (which stops the power supply).

Next, advantages of the configuration in which at least one thermistor of the eight thermistors is arranged correspondingly for one of the heating blocks HB1 to HB7.

For example, a case is assumed in which the thermistor T2-5 corresponding to the group 2 is placed at a position corresponding to the heating block HB3 in the same group 2 as that of the heating block HB5 rather than the position corresponding to the heating block HB5. In this case, the thermistor T1-3 in the thermistor group TG1 and the thermistor T2-5 in the thermistor group TG2 are placed at a position corresponding to the heating block HB3, and no thermistor is placed at a position corresponding to the heating block HB5. Also in this configuration, the temperature of the group 2 can be monitored. However, when the electrode E3 and the electric contact C3 in this configuration have a contact failure, there is a possibility that the heating block HB3 may not be heated but the heating block HB5 in the same group 2 as that of the heating block HB3 may be heated. Even when the heating block HB5 of the group 2 generates heat abnormally, the two thermistors T1-3 and T2-5 corresponding to the group 2 cannot monitor it, and the protection circuit does not work.

On the other hand, according to this embodiment, the thermistor T1-3 in the thermistor group TG1 is placed at a position corresponding to the heating block HB3, and the thermistor T2-5 in the thermistor group TG2 is placed at a position corresponding to the heating block HB5. Therefore, even when the electrode E3 and the electric contact C3 have a contact failure and the heating block HB5 in the group 2 only generates heat, the temperature may be monitored by the thermistor T2-5, and the protection circuit can be operated. As described above, because at least one thermistor of the eight thermistors is placed correspondingly for one of the heating blocks HB1 to HB7, the reliability of the apparatus may be improved.

FIG. 5 is a flowchart illustrating a control sequence of the control circuit 400 in the CPU 420. If a print request occurs in S100, the relay 430 and relay 440 are changed to an ON state in S101.

In S102, the triac 414 is PI controlled such that the temperature (signal Th1-1) sensed by the thermistor T1-1 can reach a control target temperature to control electric power to be supplied to the heating blocks HB1 and HB7.

In S103, the triac 413 is PI controlled such that the temperature (signal Th1-2) sensed by the thermistor T1-2 can reach a control target temperature to control electric power to be supplied to the heating blocks HB2 and HB6.

In S104, the triac 412 is PI controlled such that the temperature (signal Th1-3) sensed by the thermistor T1-3 can reach a control target temperature to control the electric power to be supplied to the heating blocks HB3 and HB5.

In S105, the triac 411 is PI controlled such that the temperature (signal Th1-4) sensed by the thermistor T1-4 can reach a control target temperature to control the electric power to be supplied to the heating block HB4.

As described above, the control target temperature for each of the heating blocks is set based on information regarding the size of a given recording material. In the apparatus according to this embodiment, the control target temperature for the heating block HB4 including the conveyance reference X is set to one temperature irrespective of the size of recording materials, and control target temperatures for the other heating blocks are changed based on the size of recording materials. As the size of recording materials decreases, the control target temperature to be set for the other heating blocks than the heating block HB4 is reduced.

In S106, whether the temperature rise in the non-paper-passing part is equal to or lower than a predetermined threshold temperature (tolerance temperature) Tmax is determined. According to this embodiment, Tmax is set higher than a control target temperature of 250° C. for the heating block HB4 and set to 280° C. being a lower temperature than a predetermined value of 300° C. set for the comparing unit 431 and the comparing unit 441. The positional relationship between the thermistor in the thermistor group TG1 is different from the reference X and the positional relationship between the thermistors in the thermistor group TG2 and the reference X. The thermistors in the thermistor group TG2 are placed on an outer side in the longitudinal direction of the heater 300 about the conveyance reference position X within each of the heating blocks, compared with the thermistors in the thermistor group TG1. As illustrated in FIG. 3B, the relationship may be easy to understood by comparing the distance from the reference X to the thermistor T1-4 corresponding to the heating block HB4 and the distance from the reference X to the thermistor T2-4 corresponding to the heating block HB4. Because of this arrangement, a temperature rise in a non-paper-passing part occurring within one heating block if any can be detected by the thermistors in the thermistor group TG2.

When it is determined in S106 that the temperatures sensed by the thermistors T2-4 to T2-7 are equal to or lower than the threshold temperature Tmax, the processing moves to S108. The control in S102 to S106 is repeated until the end of a print JOB is detected in S108.

If it is determined in S106 that the temperatures of the thermistors T2-4 to T2-7 are higher than the threshold temperature Tmax, the processing speed for image formation by the image forming apparatus 100 is reduced in S107, and the control target temperatures for the thermistors T1-1 to T1-4 are reduced so that fix processing can then be performed. The reduced processing speed of image formation can provide a fixing property even at a lower temperature compared with processing at full speed. Therefore, the temperature rise in the non-paper-passing part can be suppressed.

The processing above is repeated, and if the end of the print JOB is detected in S108, the relay 430 and the relay 440 are turned off in S109. Then, the control sequence for the image formation ends in S110.

Second Exemplary Embodiment

Next, a second exemplary embodiment will be described in which the heater 300 and the control circuit 400 for the heater according to the first exemplary embodiment are changed to a heater 600 and a control circuit 700. Like numbers refer to like parts in the descriptions of the first and second exemplary embodiments, and any repetitive description will be omitted. The heater 600 according to the second exemplary embodiment is different from the heater 300 in configuration of the sliding surface layer 1. The control circuit 700 has the heating blocks HB1 to HB7 all of which are controlled independently.

FIGS. 6A and 6B illustrate a configuration of the heater 600 according to the second exemplary embodiment. Because the configuration except for the sliding surface layer 1 is the same as that of the heater 300, any repetitive description will be omitted.

The sliding surface layer 1 of the heater 600 has thereon thermistors T3-1*a* to T3-4*a*, T3-1*b* to T3-3*b*, T4-4*a* to T4-7*a*, T4-5*b* to T4-7*b*, and T5 configured to detecting temperatures of the heating blocks HB1 to HB7. Because two or more thermistors are associated with all of the heating blocks HB1 to HB7, the temperatures of all of the heating blocks can be detected even when one of the thermistors fails.

The thermistor group TG3 has seven thermistors T3-1*a* to T3-4*a* and T3-1*b* to T3-3*b*, conductive patterns ET3-1*a* to ET3-4*a* and ET3-3*b*, ET3-12*b*, a common conductive pattern EG3.

Also, the thermistor group TG4 has seven thermistors T4-4*a* to T4-7*a* and thermistors T4-5*b* to T4-7*b*, conductive patterns ET4-4*a* to ET4-7*a*, ET4-5*b*, and ET4-67*b*, and a common conductive pattern EG4.

First, the thermistor group TG3 will be described. The thermistor T3-1*b* and the thermistor T3-2*b* are configured to detect temperatures of the heating blocks HB1 and HB2, and the two thermistors are connected in parallel between the conductive pattern ET3-12*b* and the common conductive pattern EG3. Also when the temperature of one of the heating blocks HB1 and HB2 increases, one of resistance values of the thermistor T3-1*b* and thermistor T3-2*b* largely decreases. Thus, the temperatures of both of the heating blocks HB1 and HB2 can be detected by one conductive pattern ET3-12*b* configured to detect resistance values of the thermistors. Therefore, the cost for forming the wiring of a conductive pattern can be reduced, compared to a case where conductive patterns are connected and are wired to the thermistor T3-1*b* and the thermistor T3-2*b*. The width in the short-side direction of the substrate 305 can be reduced. Also, the thermistor T4-6*b* and the thermistor T4-7*b* can be connected in parallel.

The common conductive patterns EG3 and EG4 are connected on the substrate 305 through a conductive pattern EG34 for disconnection detection as illustrated in FIG. 7.

Performing such a disconnection detection can increase the security level upon occurrence of a disconnection failure.

The two thermistors T3-3*a* and T3-3*b* are provided for one heating block HB3, and a temperature-detectable configuration is provided by the conductive patterns ET3-3*a* and ET3-3*b* configured to detect resistance values and the common conductive pattern EG3.

In a range of the a heating block HB3, the thermistor T3-3*b* placed at a position spaced from the conveyance reference position X is configured to detect the temperature of an edge, and the thermistor T3-3*a* placed at a position close to the conveyance reference position X is configured for temperature adjustment. A plurality of thermistors may be provided for one heating block as required.

Because the configuration and operations of thermistor group TG4 are the same as those of the thermistor group TG3, any repetitive description will be omitted.

A thermistor T5 is a single thermistor provided between the conductive patterns ET5 and EG5 for detection of resistance values. A single thermistor may be combined with a thermistor group as required.

FIG. 7 is a circuit diagram of the control circuit 700 for the heater 600 according to the second exemplary embodiment. The electric power control over the heater 600 is executed by conduction/non-conduction of a triac 711 to a triac 717. The triacs 711 to 717 operate in accordance with FUSER1 to FUSER7 signals from the CPU 420. The control circuit 700 for the heater 600 has a circuit configuration in which seven triacs 711 to 717 are used to independently control seven heating blocks HB1 to HB7.

Next, how the temperature of the heater 600 is detected will be described. The CPU 420 receives signals (Th3-1*a* to Th3-4*a*, Th3-3*b*, Th3-12*b*) acquired by dividing voltage Vcc by resistance values of the thermistor T3-1*a* to T3-4*a*, T3-1*b*, and T3-2*b* in the thermistor group TG3 and resistance values of resistances 751 to 756. The CPU 420 further receives signals acquired by dividing the voltage Vcc by resistance values of thermistors T4-4*a* to T4-7*a*, T4-5*b* to T4-7*b* in a thermistor group TG4 and resistance values of resistances 771 to 776. These signals are indicated by Th4-4*a* to Th4-7*a*, Th4-5*b*, and Th4-67*b* in FIG. 7. The CPU further receives a signal (Th5) acquired by dividing the voltage Vcc by a resistance value of a thermistor T5 and a resistance value of a resistance 761. The CPU 420 converts the received signals to temperatures based on their levels.

The CPU 420 calculates amounts of power supply by performing PI control, for example, based on set temperatures (control target temperatures) for the heating blocks and the temperatures sensed by the thermistors. The amounts of calculated power supply are converted to control times for the corresponding phase angle (phase control) or a wave number (wave number control), and the triacs 711 to 717 are controlled based on the control times.

Next, operations of the protection circuit employing the relay 430 and relay 440 will be described. Based on the Th3-1*a* to Th3-4*a* signals of the thermistor group TG3 and Th4-5*b* and Th4-67*b* signals of the thermistor group TG4, if one of the sensed temperatures exceeds the respectively set predetermined values, the comparing unit 431 causes the latch unit 432 to operate.

Also, based on Th4-4*a* to Th4-7*a* signals of the thermistor group TG4 and Th3-3*b* and Th3-12*b* signals of the thermistor group TG3, if one of the sensed temperatures exceeds the respectively set predetermined values, the comparing unit 441 causes the latch unit 442 to operate.

Next, a disconnection detection circuit 780 will be described. The disconnection detection circuit 780 is a circuit usable for improving the security in a case where the common conductive pattern EG3 and EG4 are disconnected.

Circuit operations of the disconnection detection circuit 780 will be described. When the common conductive patterns EG3 and EG4 are disconnected, the pull-up to the power supply voltage Vcc by a resistance 781 and a resistance 782 changes the disconnection detection signal ThSafe to a High state. The resistance 781 and resistance 782 are provided in consideration of a failure due to a short circuit of the resistances. When the disconnection detection signal ThSafe is changed to a High state, the latch unit 432 and latch unit 442 are caused to operate.

Next, effects of the disconnection detection circuit 780 and conductive pattern EG34 will be described. First, a case will be described in which the common conductive pattern EG3 and the common conductive pattern EG4 are connected to a GND, as in the configuration of the first exemplary embodiment, without both of the conductive pattern EG34 and the disconnection detection circuit 780. In this case, when the common conductive pattern EG3 is disconnected, all of the thermistors of the thermistor group TG3 are disabled. Thus, the protection circuit does not work which is configured to terminate power supply to the heating blocks HB1 to HB3. Also, when the common conductive pattern EG4 is disconnected, all of the thermistors of the thermistor group TG4 are disabled. Thus, the protection circuit does not work which is configured to terminate the heating blocks HB5 to HB7.

Next, a case will be described in which the common conductive patterns EG3 and EG4 are connected to a GND, as in the configuration of the first exemplary embodiment, without the disconnection detection circuit 780, though the conductive pattern EG34 is provided which connected the common conductive patterns EG3 and EG4. In this case, because of the effect of the conductive pattern EG34, one of the common conductive patterns EG3 and EG4 is connected to a GND through the conductive pattern EG34 even when the other one is disconnected. Thus, the temperature detection can be performed by the thermistor groups TG3 and TG4. However, a connector, not illustrated, configured to connect the conductive patterns (ET3-1*a* to ET3-4*a*, and ET3-12*b*, ET3-3*b*, and EG3) of the thermistor group TG3 and the control circuit 700 is disconnected, all of the thermistors of the thermistor group TG3 are disabled. Thus, the protection circuit does not work which terminates the power supply to the heating blocks HB1 to HB3. Also, a connector configured to connect the conductive patterns (ET4-4*a* to ET4-7*a*, and ET4-67*b*, ET4-5*b*, and EG4) of the thermistor group TG4 and the control circuit 700 is disconnected, all of the thermistors of the thermistor group TG4 are disabled. Thus, the protection circuit does not work which terminates power supply to the heating blocks HB5 to HB7.

On the other hand, the apparatus of this embodiment has the conductive pattern EG34 and the disconnection detection circuit 780. Thus, failure states of both cases where the common conductive patterns EG3 and EG4 are disconnected and where the connector connecting the thermistor groups TG3 and TG4 and the control circuit 700 is disconnected can be detected.

FIG. 8 is a flowchart illustrating a control sequence over the control circuit 700 to be performed by the CPU 420. Like numbers refer to like components in FIG. 5 and FIG. 8, and any repetitive description will be omitted.

In S201, the triac 711 is PI-controlled such that the temperature (signal Th3-1*a*) sensed by the thermistor T3-1*a* can reach a predetermined target temperature to control the electric power to be supplied to the heating block HB1.

In S202, the triac 712 is PI-controlled such that the temperature (signal Th3-2*a*) sensed by the thermistor T3-2*a* can reach a predetermined target temperature to control the electric power to be supplied to the heating block HB2.

In S203, the triac 713 is PI-controlled such that the temperature (signal Th3-3*a*) sensed by the thermistor T3-3*a* can reach a predetermined target temperature to control the electric power to be supplied to the heating block HB3.

In S204, the triac 714 is PI-controlled such that the temperature (signal Th5) sensed by the thermistor T5 can reach a predetermined target temperature to control the electric power to be supplied to the heating block HB4.

In S205, the triac 715 is PI-controlled such that the temperature (signal Th4-5*a*) sensed by the thermistor T4-5*a* can reach a predetermined target temperature to control the electric power to be supplied to the heating block HB5.

In S206, the triac 716 is PI-controlled such that the temperature (signal Th4-6*a*) sensed by the thermistor T4-6*a* can reach a predetermined target temperature to control the electric power to be supplied to the heating block HB6.

In S207, the triac 717 is PI-controlled such that the temperature (signal Th4-7*a*) sensed by the thermistor T4-7*a* can reach a predetermined target temperature to control the electric power to be supplied to the heating block HB7.

In S208, whether the temperature rise in the non-paper-passing part is equal to or lower than a predetermined threshold temperature (tolerance temperature) Tmax is determined.

When it is determined in S208 that the temperatures sensed the thermistors T3-4*a*, T4-4*a*, T3-3*b*, and T4-5*b* are equal to or lower than the threshold temperature Tmax, the processing moves to S108. Then, the control in S201 to S208 is repeated until the end of the print JOB is detected in S108.

Third Exemplary Embodiment

A heater 800 in FIGS. 9A and 9B has a heating resister 802 closely to a fixing nip part N and a thermistor group TG6 on the opposite side of the fixing nip part N. Like numbers refer to like parts in the descriptions of the first and third exemplary embodiments, and any description will be omitted.

FIG. 9A is a cross section view of a center area (near a conveyance reference position X) of the heater 800. A back surface layer 1 has a conductive pattern only, and a chip thermistor T6-2 is bonded thereon. The heater 800 further has electrodes 810 and 811 for the chip thermistor T6-2. The chip thermistor T6-2 is connected to a conductive pattern EG6 and a conductive pattern ET6-2 through the electrode 810 and electrode 811. Placing the thermistor group TG6 on the opposite side of the fixing nip part N as in the heater 800 can eliminate the necessity of flatness of a sliding surface layer thereof so that the thick chip thermistor T6-2 can be mounted.

The thermistor group TG6 provided in the back surface layer 1 of the heater 800 has three chip thermistors T6-1 to T6-3, conductive patterns ET6-1 to ET6-3 configured to detect resistance values of the thermistors, and a common conductive pattern EG6.

A sliding surface layer 1 of the heater 800 has three heating blocks HB1 to HB3. The heating resister 802 is divided into three of 802-1 to 802-3 and receives power supply through the first electric conductor 801 and the three second electric conductors 803-1 to 803-3. The second electric conductors 803-1 to 803-3 are connected to electrodes E1 to E3, and the first electric conductor 801 is connected to an electrode E8. A switch element such as a triac is provided for each of the electrodes E1 to E3 where the electrode E8 is provided as a common electrode so that the three heating blocks HB1 to HB3 can be controlled independently from each other. A sliding surface layer 2 of the heater 800 has a protective layer 808 of glass having a sliding property and an insulative property.

In the heater 800, the first electric conductor 801 and the second electric conductor 803 may be connected by wiring on both ends of the heater in a short-side direction for power supply to the heating blocks HB1 to HB3. Because of the necessity, when the number of heating blocks increases in particular, the area for wiring the first electric conductor 801 and the second electric conductor 803 may increase, which thus increases the size of the heater.

The electrodes E2 to E6 may be provided within a heating region, as in the heater 300 according to the first exemplary embodiment and the heater 600 according to the second exemplary embodiment so that the area required for wiring the first electric conductor 301 and the second electric conductor 303 is not required. Thus, the size of the heater does not increase while the number of heating blocks can be increased. In the configuration having the electrodes E2 to E6 in a heating region, the electrode E2 to the electrode E6 may be required to be provided on the opposite side of the fixing nip part N for connecting electric contacts C2 to C6. For that, the heating blocks (HB1 to HB7) may be provided on the opposite side of the fixing nip part N, the thermistor groups (TG1, TG2, TG3, and TG4) may be formed closely to the fixing nip part N.

When a lower number of heating blocks are provided, the thermistor group TG6 having a plurality of chip thermistors may be placed on the opposite side of the fixing nip part N, as in the heater 800 according to this exemplary embodiment.

Fourth Exemplary Embodiment

A heater according to a fourth exemplary embodiment illustrated in FIGS. 10A and 10B is different from the heaters according to the first exemplary embodiment and the second exemplary embodiment in shape of heating resisters. Heating resisters 902*a* and 902*b* in a heater 900 illustrated in FIG. 10A are continuous (or not divided) in a longitudinal direction.

FIG. 10A is a plan view of a back surface layer 1 of the heater 900. Because an electric conductor 303 is divided into seven in the longitudinal direction, the heating resistors 902*a* and 902*b* are controlled in temperature independently in a region of heating blocks HB1 to HB7. Because the heating resistors 902*a* and 902*b* are not divided, the heater 900 generates heat continuously in the longitudinal direction even in a gap region in which the electric conductor 303 is divided. Thus, no region exists in which the heating value is equal to 0 (zero), and the heater can thus generate heat uniformly in the longitudinal direction.

A heater 1000 illustrated in FIG. 10B has heating resisters 1002*a* and 1002*b* further divided into a plurality of heating resisters which are connected in parallel.

FIG. 10B is a plan view of a back surface layer 1 of the heater 1000. The heating resister 1002*a* is divided into a plurality of heating resisters which are connected in parallel between a connected electric conductor 303 and an electric conductor 301*a*. Also, the heating resister 1002*b* is divided into a plurality of heating resisters which are connected in parallel between the electric conductor 303 and the electric conductor 301*a*.

The heating resisters acquired by dividing the heating resisters 1002*a* and 1002*b* are tilted in the longitudinal direction and the short-side direction of the heater 1000 and overlap with each other in the longitudinal direction of the heater 1000. This can reduce the influence of the gaps between the plurality of divided heating resisters and can thus improve the uniformity of the heating distribution in the longitudinal direction of the heater 1000. In the heater 1000, because the divided heating resisters at the edges of adjacent heating blocks overlap with each other in the longitudinal direction, a more uniform heating distribution can be provided in the longitudinal direction of the heater 1000 even in gaps between the heating blocks. The heating resisters at the edges of adjacent heating blocks may be, for example, a heating resister at the right end of the heating block HB1 and a heating resister at the left end of the heating block HB2.

Uniformity of heating distributions of the heating resisters 1002*a* and 1002*b* may be acquired by adjusting the width, length, interval, slope and so on of the divided heating resisters. Adoption of the configuration of the heater 900 or heater 1000 can inhibit unevenness in temperature in gaps between a plurality of heating blocks.

Fifth Exemplary Embodiment

FIGS. 11A and 11B illustrate waveforms of electric current fed to the heating blocks in the control circuit 400 according to the first exemplary embodiment. FIG. 11A illustrates a driving pattern (or a table of waveforms of electric current to be fed to the heating block HB4) for the triac 411, which are defined for each duty ratio of electric power to be supplied to the heater 300. Also, FIG. 11B illustrates driving patterns (or tables of waveforms of electric current to be fed to the heating blocks HB1 to HB3, and HB5 to HB7) for triacs 412 to 414.

The CPU 420 calculates a level (duty ratio) of electric power to be supplied to the heater for each one control period and then selects a waveform according to the duty ratio for each heating block to which the electric power is to be supplied. In a control method according to this exemplary embodiment, four half-waves are defined as one control period to set a conduction control pattern for each triac and thus control electric power to be supplied to the heater 300.

An example of the conduction control pattern for the triac 411 will be described where the duty ratio is equal to 25%. According to a conduction control pattern A for the triac 411 illustrated in FIG. 11A, a first half-wave to a second half-waves are controlled by a 90° phase angle to supply 50% electric power, and power supply is turned off in a third half-wave to a fourth half-wave. Thus, an average of 25% electric power is supplied to the heating block HB4 of the heater 300. In the conduction control pattern A, phase control is performed in the first half-wave to the second half-wave.

In a conduction control pattern for the triacs 412 to 414 illustrated in FIG. 11B, a third half-wave to a fourth half-wave are controlled with 90° phase angle to supply 50% electric power, and the power supply is turned off in the first half-wave to the second half-wave. Thus, an average of 25% electric power is supplied to the heating blocks HB1 to HB3, and HB5 to HB7 of the heater 300. A conduction control pattern B performs phase control in the third half-wave to the fourth half-wave.

Because the heating block HB4 of the heater 300 has a lower resistance value than those of the other heating blocks, the amount of change in electric current during the phase control is larger, compared with the other heating blocks. According to this embodiment, the period (first half-wave to second half-wave) for feeding electric current of the phase control to the heating block HB4 is different from the period (third half-wave to fourth half-wave) for feeding electric current of phase control to the other heating blocks HB1 to HB3, and HB5 to HB7. Thus, the fluctuation of the electric current under the phase control fed to the entire heater 300 can be suppressed. The same is true for other duty ratios than 25%.

As illustrated in FIGS. 11A and 11B, the control periods for a plurality of triacs may be synchronized for control (which is called synchronized control over a plurality of triacs) so that harmonic current in the image heating device 200 can be reduced. FIGS. 11A and 11B illustrate an exemplary synchronized control, and synchronized control over a plurality of triacs may be performed to reduce flicker, for example.

The same method is applicable to the triacs 711 to 717 in the control circuit 700 to execute synchronized control over a plurality of triacs.

The synchronized control over a plurality of triacs can advantageously reduce harmonic current and flicker and can further satisfy standards against harmonic current and flicker even when a total resistance value of the heater 300 is set lower. When a lower resistance value can be set for the heater 300, maximum electric power which can be supplied from the AC power supply 401 to the heater 300 can be increased.

In the plurality of exemplary embodiments as described above, a center reference printer is used in which a recording material is conveyed by placing the center of the recording material in the width direction at a conveyance reference position X. However, the present invention is also applicable to a one-side reference printer in which one end in the longitudinal direction of a heater is defined as a conveyance reference position, and a recording material is conveyed by placing one end in the width direction of the recording material at the conveyance reference position.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST

200 Image heating device
300 Heater
301 First electric conductor
302 Heating resister
303 Second electric conductor
305 Substrate
E1 to E7, E8-1, E8-2 Electrodes
HB1 to HB7 Heating blocks

The invention claimed is:

1. A heater for use in an image heating device, the heater comprising:

a substrate;

a first heating block provided on the substrate and configured to generate heat by electric power supplied thereto, the first heating block being controlled by a first switching element;

a second heating block provided on the substrate at a position different from the position of the first heating block in a longitudinal direction of the substrate and configured to generate heat by electric power supplied thereto, the second heating block being controlled by a second switching element;

a third heating block provided on the substrate at a position different from the positions of the first and second heating blocks in the longitudinal direction of the substrate and configured to generate heat by electric power supplied thereto, the third heating block being controlled by the first switching element;

a fourth heating block provided on the substrate at a position different from the positions of the first, second and third heating blocks in the longitudinal direction of the substrate and configured to generate heat by electric power supplied thereto, the fourth heating block being controlled by the second switching element;

a first temperature sensor provided at a position corresponding to the first heating block;

a second temperature sensor provided at a position corresponding to the second heating block;

a third temperature sensor provided at a position corresponding to the third heating block; and a fourth temperature sensor provided at a position corresponding to the fourth heating block, wherein the first temperature sensor and the second temperature sensor are electrically connected to a first common conductor, and the third temperature sensor and the fourth temperature sensor are electrically connected to a second common conductor which is not electrically connected to the first common conductor.

2. The heater according to claim 1, wherein each of the first to fourth heating blocks has a first electric conductor provided along the longitudinal direction, a second electric conductor provided along the longitudinal direction at a different position in a short-side direction of the substrate from that of the first electric conductor, and a heat generating member provided between the first electric conductor and the second electric conductor and configured to generate heat by the electric power supplied through the first electric conductor and the second electric conductor.

3. The heater according to claim 1, wherein the first to fourth temperature sensors are provided on a substrate surface on the opposite side of a substrate surface having the first to fourth heating blocks of the substrate.

4. An image heating device heating an image formed on a recording material, the image heating device comprising:

a tubular film; and a heater provided in an internal space of the film, a first switching element configured to control electric power;

a second switching element configured to control electric power;

wherein the heater includes, a substrate;

a first heating block provided on the substrate and configured to generate heat by electric power supplied thereto, the first heating block being controlled by the first switching element;

a second heating block provided on the substrate at a position different from the position of the first heating block in a longitudinal direction of the substrate and configured to generate heat by electric power supplied thereto, the second heating block being controlled by the second switching element;

a third heating block provided on the substrate at a position different from the positions of the first and second heating blocks in the longitudinal direction of the substrate and configured to generate heat by electric power supplied thereto, the third heating block being controlled by the first switching element;

a fourth heating block provided on the substrate at a position different from the positions of the first, second and third heating blocks in the longitudinal direction of the substrate and configured to generate heat by electric power supplied thereto, the fourth heating block being controlled by the second switching element;

a first temperature sensor provided at a position corresponding to the first heating block;

a second temperature sensor provided at a position corresponding to the second heating block;

a third temperature sensor provided at a position corresponding to the third heating block; and a fourth temperature sensor provided at a position corresponding to the fourth heating block, wherein the first temperature sensor and the second temperature sensor are electrically connected to a first common conductor, and the third temperature sensor and the fourth temperature sensor are electrically connected to a second common conductor which is not electrically connected to the first common conductor.

5. The image heating device according to claim 4, wherein the heater is in contact with an inner surface of the film.

6. The image heating device according to claim 5, further comprising a roller configured to form a nip portion in cooperation with the heater through the film for nipping the recording material.

* * * * *